(12) United States Patent
Hattori

(10) Patent No.: US 10,380,435 B2
(45) Date of Patent: Aug. 13, 2019

(54) IMAGE PROCESSING APPARATUS

(71) Applicant: DENSO CORPORATION, Kariya, Aichi pref. (JP)

(72) Inventor: Yousuke Hattori, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/562,868

(22) PCT Filed: Mar. 9, 2016

(86) PCT No.: PCT/JP2016/057281
§ 371 (c)(1),
(2) Date: Sep. 28, 2017

(87) PCT Pub. No.: WO2016/158261
PCT Pub. Date: Oct. 6, 2016

(65) Prior Publication Data
US 2018/0114075 A1 Apr. 26, 2018

(30) Foreign Application Priority Data
Apr. 2, 2015 (JP) .................................. 2015-075829

(51) Int. Cl.
*G06K 9/00* (2006.01)
*G01B 11/00* (2006.01)
(Continued)

(52) U.S. Cl.
CPC ............ *G06K 9/00805* (2013.01); *B60T 7/22* (2013.01); *B60W 30/09* (2013.01); *G01B 11/00* (2013.01);
(Continued)

(58) Field of Classification Search
CPC ........... B60R 2021/01259; B60R 2021/01265; B60R 21/0134; B60R 21/01538;
(Continued)

(56) References Cited

U.S. PATENT DOCUMENTS 5,835,008 A * 11/1998 Colemere, Jr. ........ B60Q 1/441
340/439
8,050,863 B2 * 11/2011 Trepagnier ............ B60W 30/00
180/167

(Continued)

FOREIGN PATENT DOCUMENTS

JP 2001043383 A 2/2001
JP 2007164636 A 6/2007
JP 2008308024 A 12/2008

*Primary Examiner* — Aklilu K Woldemariam
(74) *Attorney, Agent, or Firm* — Knobbe, Martens, Olson & Bear LLP

(57) ABSTRACT

An image processing apparatus includes an image acquisition unit that uses a camera installed in an own vehicle to acquire images of an environment outside the own vehicle at predetermined intervals, an object candidate recognition unit that recognizes an object candidate in the image, an object determination unit that determines that the object candidate is an object on condition that the same object candidate is recognized in N consecutive frame images (N is a natural number), a parameter X acquisition unit that acquires a parameter X correlated with an apparent moving speed of a stationary object in the images, and an N setting unit that sets N smaller as the moving speed correlated with a value of the parameter X increases.

6 Claims, 7 Drawing Sheets

(51) Int. Cl.
*B60T 7/22* (2006.01)
*G06T 7/70* (2017.01)
*B60W 30/09* (2012.01)
*G01B 11/14* (2006.01)
*G08G 1/16* (2006.01)
*G06T 7/246* (2017.01)
*B60T 7/12* (2006.01)
*B60T 8/00* (2006.01)

(52) U.S. Cl.
CPC .............. *G01B 11/14* (2013.01); *G06T 7/246* (2017.01); *G06T 7/70* (2017.01); *G08G 1/167* (2013.01); *B60T 7/12* (2013.01); *B60T 8/00* (2013.01); *B60T 2201/022* (2013.01); *B60W 2420/42* (2013.01); *B60W 2550/10* (2013.01); *G06T 2207/10016* (2013.01); *G06T 2207/30252* (2013.01)

(58) Field of Classification Search
CPC ........ B60R 21/01552; B60R 21/01554; B60R 25/25; B60R 2022/208; B60R 2021/01302; B60R 21/013; B60R 21/233; B60R 2300/804; B60T 7/22; B60T 2201/08; B60T 8/172; B60T 8/58; B60T 8/00; B60W 2420/403; B60W 2420/52; B60W 2520/10; B60W 2520/14; B60W 2540/00; B60W 2420/42; B60W 2550/10; B60W 30/09; B60W 10/20; B60W 50/14; B60W 2520/105; B60W 40/10; B60W 30/00; G08G 1/16; G08G 1/163; G08G 1/166; G08G 1/017; G08G 1/167; G08G 1/142; G08G 1/20; G08G 1/0175; B60C 23/007; B60C 23/20; B60C 23/12; G10K 2210/3219; G01S 17/026; G01S 17/936; G01S 13/726; G01S 2013/9353; G01S 2013/9378; G06K 9/00597; G06K 9/325; G06K 2209/15; G06K 9/00771; G06K 9/00785; G06K 9/00798; G06K 9/00624; G06K 9/00805; G06K 19/073; G06K 9/00845; G06Q 10/08; G06Q 20/40; G07B 15/00; G07B 15/06; G01B 11/14; G06T 2207/30252; G06T 7/20; G06T 7/70; G06T 7/215; B60K 37/02; G01F 23/20; H01Q 1/22; H01Q 1/2241; B60G 2800/914; B61L 3/008; A63H 2019/246; B60N 2002/0272; G02B 2027/014; G05D 2201/0213; G06F 21/73; G06F 2221/2111; G06F 3/0484; H04N 2201/3242; H04N 1/00326; G11B 7/007; H04L 9/32; B43K 29/08; B60L 2240/441

USPC .......... 701/1, 13, 37, 70, 301; 235/382, 384; 340/439, 928

See application file for complete search history.

(56) References Cited

U.S. PATENT DOCUMENTS

| | | | | |
|---|---|---|---|---|
| 8,331,621 | B1* | 12/2012 | Allen | G08G 1/042 235/384 |
| 8,655,546 | B2* | 2/2014 | Natori | B60Q 1/52 701/301 |
| 2006/0025897 | A1* | 2/2006 | Shostak | B60C 23/005 701/1 |
| 2006/0142916 | A1* | 6/2006 | Onuma | B60G 17/015 701/38 |
| 2006/0180371 | A1* | 8/2006 | Breed | G07C 5/008 180/197 |
| 2006/0278705 | A1* | 12/2006 | Hedley | G07B 15/063 235/384 |
| 2007/0008179 | A1* | 1/2007 | Hedley | G07B 15/06 340/928 |
| 2008/0282817 | A1* | 11/2008 | Breed | B60C 11/24 73/865.9 |
| 2010/0106387 | A1* | 4/2010 | Tsuchida | B60R 21/0134 701/70 |
| 2011/0169625 | A1* | 7/2011 | James | B60Q 9/008 340/439 |
| 2011/0288909 | A1* | 11/2011 | Hedley | G06Q 30/0283 705/13 |
| 2012/0136506 | A1* | 5/2012 | Takeuchi | B60G 17/016 701/1 |
| 2012/0253628 | A1* | 10/2012 | Maruyama | B60W 50/085 701/93 |
| 2014/0049646 | A1* | 2/2014 | Nix | B60R 1/002 348/148 |
| 2015/0104757 | A1* | 4/2015 | Moncrief | G09B 9/302 434/38 |
| 2016/0264135 | A1* | 9/2016 | Yamakado | B60T 7/12 |
| 2017/0098131 | A1* | 4/2017 | Shashua | G06K 9/00805 |

* cited by examiner

IMAGE PROCESSING APPARATUS

TECHNICAL FIELD

The present invention relates to an image processing apparatus.

BACKGROUND ART

Conventionally, a technique is known for recognizing an object in an image that is captured by using an in-vehicle camera and performing a process to avoid a collision with the recognized object (refer to patent literature 1).

CITATION LIST

Patent Literature

[Patent Literature 1] JP-A-2008-308024

SUMMARY OF THE INVENTION

Technical Problem

To increase the accuracy in recognizing an object, a processing method can be considered in which it is finally determined that an object is recognized when the same object has been successively recognized in a plurality of frames. In this case, depending on the conditions of an own vehicle, around it, or the like, an object may not be appropriately recognized.

Solution to Problem

An embodiment provides an image processing apparatus that can appropriately recognize an object.

The image processing apparatus of the embodiment includes an image acquisition unit that uses a camera installed in an own vehicle to acquire images of an environment outside the own vehicle at predetermined intervals; an object candidate recognition unit that recognizes an object candidate in the image; an object determination unit that determines that the object candidate is an object on condition that the same object candidate is recognized in N consecutive frame images (N is a natural number); a parameter X acquisition unit that acquires a parameter X correlated with an apparent moving speed of a stationary object in the images; and an N setting unit that sets N smaller as the moving speed correlated with a value of the parameter X increases.

DESCRIPTION OF THE EMBODIMENTS

Figure 1:
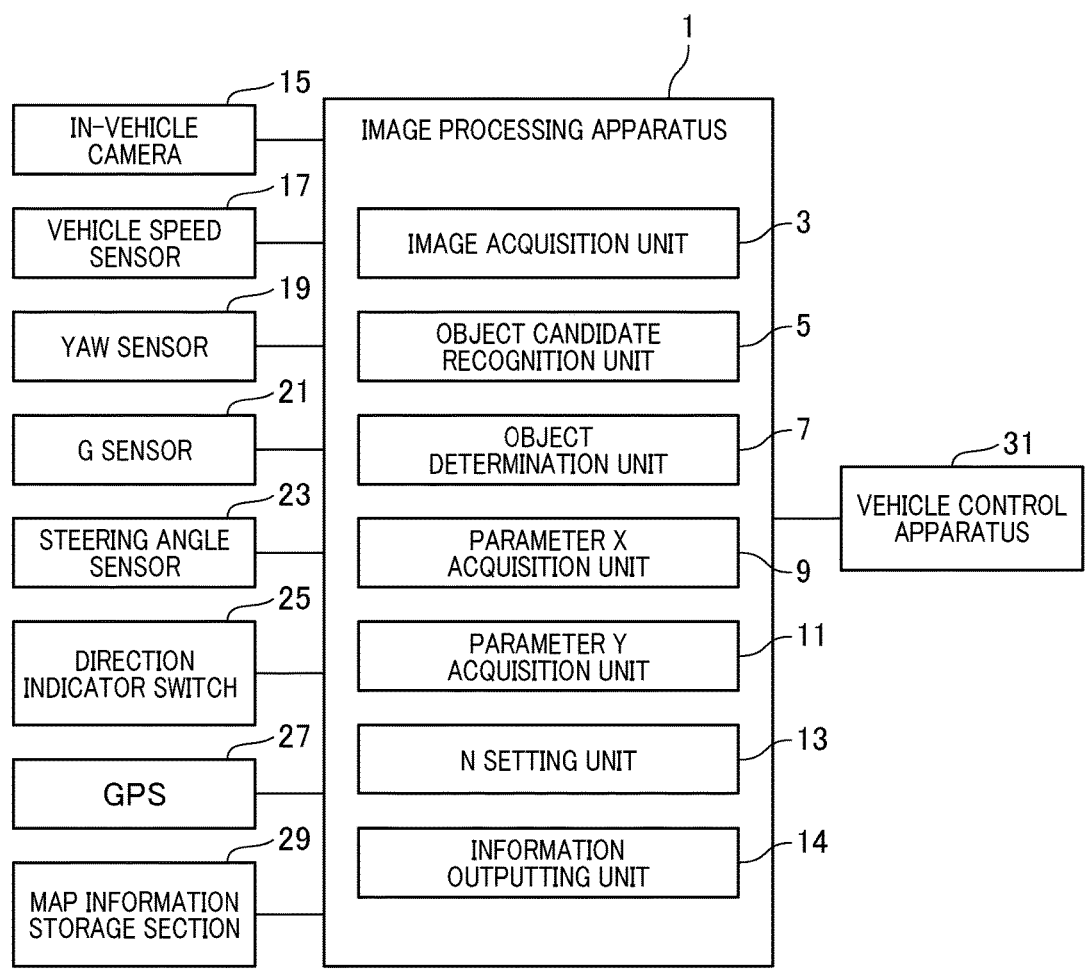
FIG. 1 is a block diagram showing the configuration of an image processing apparatus.

Embodiments of the present invention will be described with reference to the drawings.

First Embodiment

1. Description of an Image Processing Apparatus 1 and the Related Configuration Thereof.

The image processing apparatus 1 is an in-vehicle apparatus to installed in a vehicle. Hereinafter, the vehicle in which the image recognition apparatus 1 is installed will be referred to as an own vehicle. The image processing apparatus 1 is a known computer including a CPU, a RAM, a ROM, and the like. The image processing apparatus 1 performs processes described later in accordance with a program stored in the ROM.

The image processing apparatus 1 functionally includes an image acquisition unit 3, an object candidate recognition unit 5, an object determination unit 7, a parameter X acquisition unit 9, a parameter Y acquisition unit 11, an N setting unit 13, and an information outputting unit 14. The functions of the units are described later.

The own vehicle includes, in addition to the image processing apparatus 1, an in-vehicle camera 15, a vehicle speed sensor 17, a yaw sensor 19, a G sensor 21, a steering angle sensor 23, a direction indicator switch 25, a GPS 27, a map information storage section 29, and a vehicle control apparatus 31.

The in-vehicle camera 15 is a camera that is installed in the own vehicle. The in-vehicle camera 15 repeatedly captures, or generates images of the environment outside the own vehicle at predetermined intervals. The optical axis of the in-vehicle camera 15 is fixed to the own vehicle. It is noted, hereinafter, an image obtained in one imaging is referred to as one frame.

The vehicle speed sensor 17 detects a speed of the own vehicle. The yaw sensor 19 detects a yaw rate of the own vehicle. The G sensor 21 detects an acceleration G of the own vehicle in the longitudinal direction thereof. It is noted that the acceleration G has a correlation with the amplitude of pitching of the own vehicle, and the greater the acceleration G becomes, the greater the amplitude of pitching becomes. The steering angle sensor 23 detects a steering angle of the own vehicle. The direction indicator switch 25 is operated by the driver of the own vehicle, and performs direction indication in accordance with the operation. In addition, the direction indicator switch 25 outputs a signal expressing the direction indication contents to the image processing apparatus 1.

The GPS 27 acquires information concerning the position of the own vehicle. The map information storage section 29 stores map information. The vehicle control apparatus 31 receives object information, described hereinafter, from the image processing apparatus 1, and performs a collision avoidance support process (for example, automatic braking, brake assist, warning information output, automatic steering, and the like) in accordance with the object information. The vehicle control apparatus 31 is a known type of computer, including a CPU, a RAM, a ROM, and the like. The vehicle control apparatus 31 performs the above process in accordance with the program that is stored in the ROM.

2. Target Recognition Process Performed by the Image Processing Apparatus 1

Figure 2:
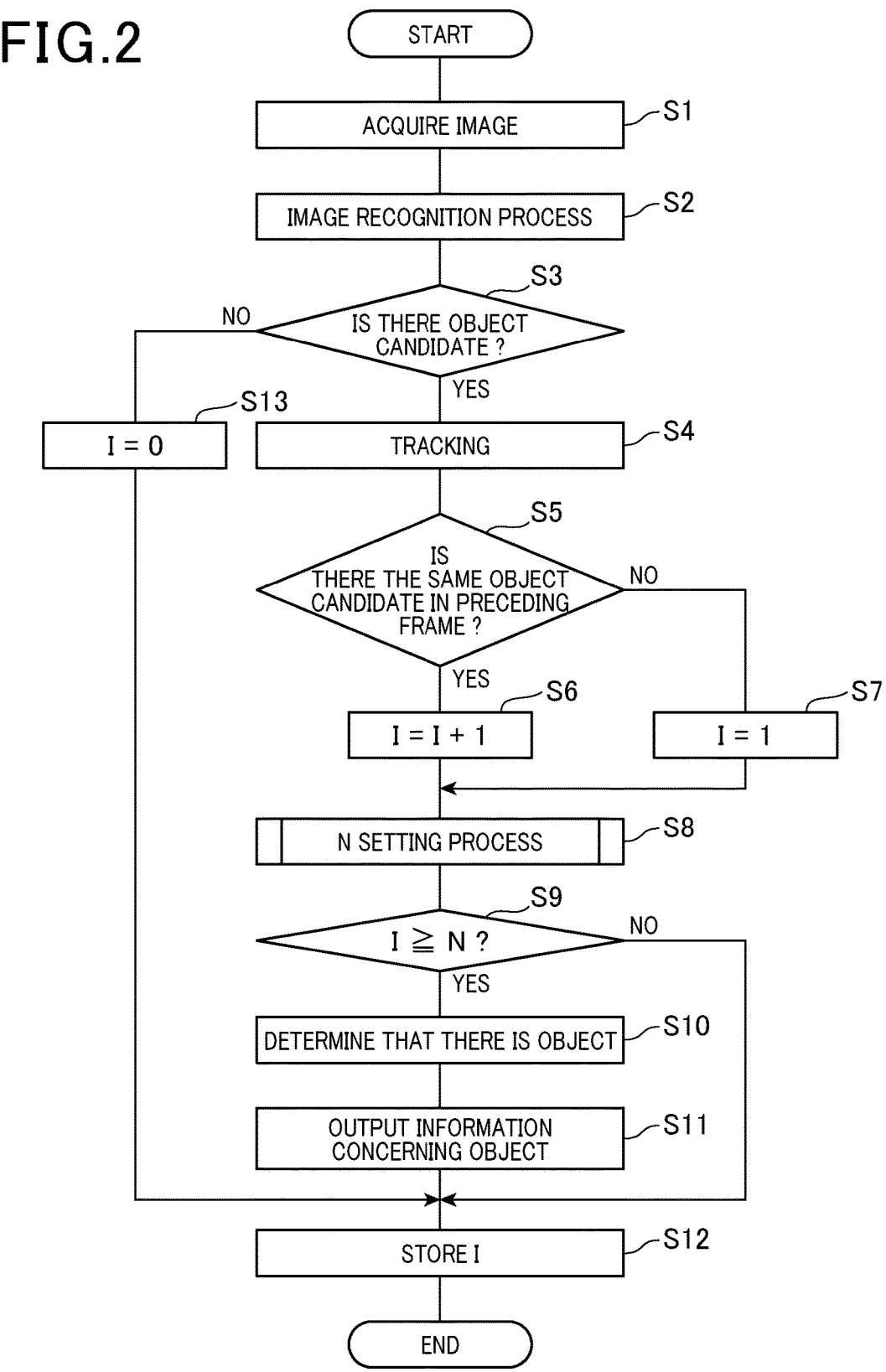
FIG. 2 is a flowchart illustrating an object recognition process performed by the image processing apparatus.
Figure 3:
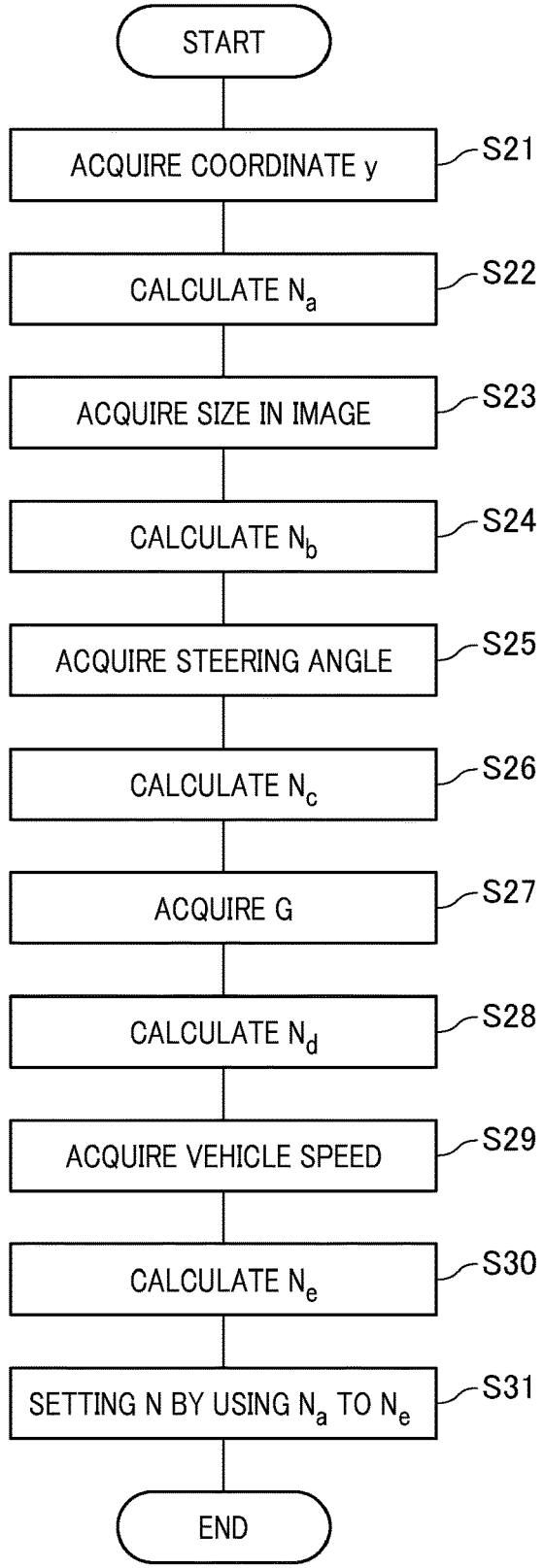
FIG. 3 is a flow diagram illustrating an N setting process performed by the image processing apparatus.

The target recognition process repeatedly performed by the image processing apparatus 1 at predetermined intervals will be described with reference to FIG. 2 and FIG. 4. In step S1 of FIG. 2, the image acquisition unit 3 uses the in-vehicle camera 15 to acquire an image of one frame.

In step S2, the object candidate recognition unit 5 performs a known image recognition process on the image of one frame acquired in the step S1.

In step S3, the object candidate recognition unit 5 determines whether or not an object candidate has been recognized in the step S2. The object candidate signifies one that has been determined to be an object as a result of the image recognition process for an image of one frame, but has not been finally determined to be an object. If it is determined that an object is recognized, the present process proceeds to step S4. If it is determined that no object is recognized, the present process proceeds to step S13.

In step S4, the object determination unit 7 performs tracking. The tracking signifies a process for searching, in the preceding frame, an object (hereinafter, referred to as a related object candidate) that can be associated with an object recognized in the step S2. The related object candidate is an object candidate that can be estimated to be identical to the object candidate recognized in the step S2.

The conditions for the related object candidate are that the amount of change in position and amount of change in size of the object candidate in question, relative to the object candidate recognized in the step S2, are respective predetermined threshold values or less.

Figure 4:
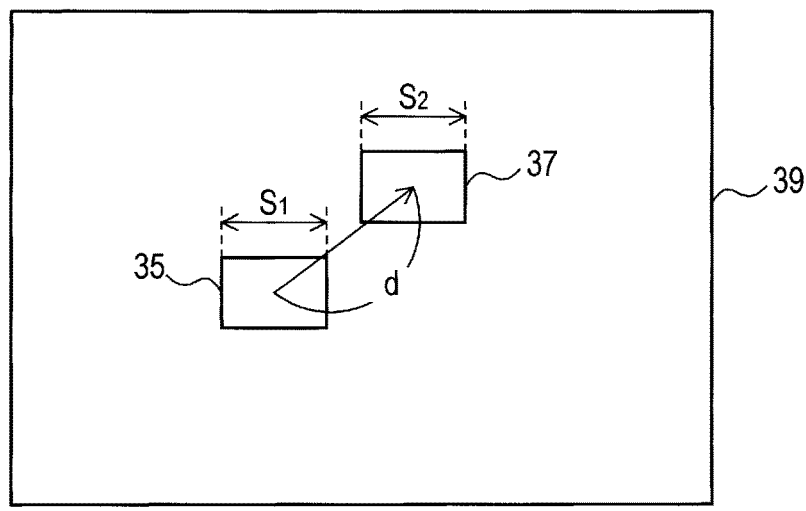
FIG. 4 is an explanatory diagram showing related object candidates.

For example, as shown in FIG. 4, it is assumed that an object candidate 35 having size $S_1$ has been recognized in an image 39 in the preceding frame, while an object candidate 37 having size $S_2$ has been recognized in the image 39 in the latest frame. If the magnitude d of the change in position between the object candidate 35 and the object candidate 37 is a predetermined threshold value or less, and the amount of change between the size S1 and the size S2 is a predetermined threshold value or less, the object candidate 35 and the object candidate 37 are associated as related object candidates.

Returning to FIG. 2, in step S5, the object determination unit 7 determines, from the results of the tracking in the step S4, whether the related object candidate of the object candidate recognized in the step S2 was present in the preceding frame. If the related object candidate was present in the preceding frame, the process proceeds to step S6. If the related object candidate was not present in the preceding frame, the process proceeds to step S7.

In step S6, the object determination unit 7 increments a recognition number I by one, at that time point, to update the value of the recognition number I. The recognition number I expresses the cumulative number of frames from which related object candidates have been consecutively found up to that time point. Hence, if the recognition number is I, it indicates that related object candidates have been continuously discovered in images of I frames continuing up to the latest frame.

In step S7, the object determination unit 7 sets the recognition number I to 1.

In step S8, the N setting unit 13 sets a value of N. N is a natural number, used in determination in the next step S9. The method of setting N will be described later.

In step S9, the object determination unit 7 determines whether or not the recognition number I set in the step S6 or S7 is equal to or more than N set in the step S8. If the recognition number I is equal to or more than N, the present process proceeds to step S10. If I is less than N, the present process proceeds to step S12.

In step S10, the object determination unit 7 determines that the object candidate recognized in the step S2 is an object.

In step S11, the information outputting unit 14 outputs object information concerning the object that has been determined to be an object in step S10. The object information includes the position of the object in an image, the size of the object in the image, the shape of the object, and the like. It is noted that the vehicle control apparatus 31 receives the object information, and uses the object information to determine the position of the object, the direction of the object, the type of the object, and the like. The collision avoidance support process is performed based on the determination results.

In step S12, the object determination unit 7 stores the latest value of I.

In contrast, if a negative determination is made in the step S3, the present process proceeds to step S13, in which the object determination unit 7 updates the value of the recognition number I to zero, and the present process ends.

3. N Setting Processing Performed by the Image Processing Apparatus 1

Figure 5:
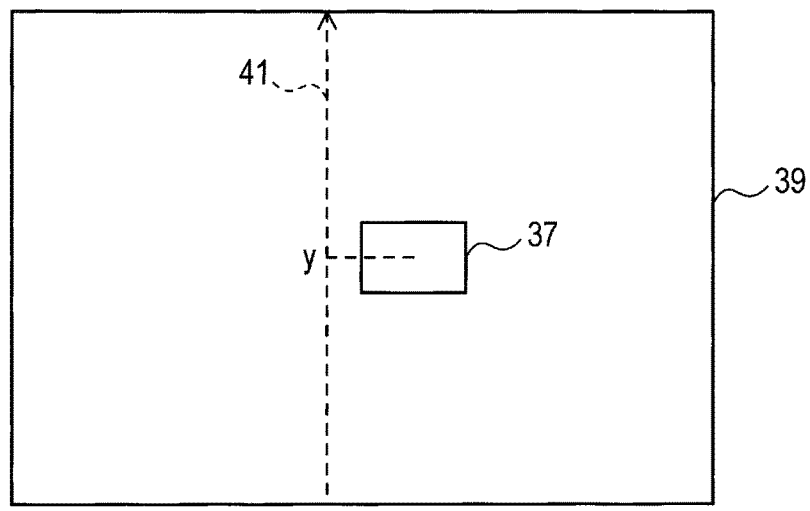
FIG. 5 is an explanatory diagram showing a coordinate y.

The N setting process of the step S8 will be described with reference to FIG. 3 and FIGS. 5 to 12E. In step S21 in FIG. 3, the parameter Y acquisition unit 11 acquires the position of the object candidate recognized in the step S2 in the vertical direction in the image acquired in the step S1. As shown in FIG. 5, the position in the vertical direction is the coordinate y of the object candidate 37 on a vertical axis 41, where the vertical axis 41 is assumed to be that of the image 39. The coordinate y has a positive value, and the higher the position of the object candidate 37 in the vertical direction, the larger the value of the y coordinate. It is noted that the coordinate y is an example of a parameter Y, which is correlated with the distance from the own vehicle to the object. The longer the distance from the own vehicle to the object becomes, the larger the coordinate y becomes.

Figure 6:
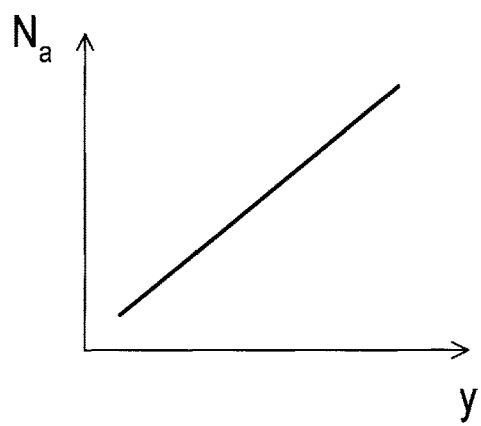
FIG. 6 is a graph showing a relationship between the coordinates y and $N_a$.

In step S22, the N setting unit 13 calculates $N_a$ from the coordinate y acquired in the step S21. $N_a$ is a natural number. The N setting unit 13 is previously provided with a map that outputs $N_a$ when receiving the coordinate y. The N setting unit 13 calculates $N_a$ by inputting the coordinate y to the map. As shown in FIG. 6, a relationship is established between the coordinate y and $N_a$ in which the larger the value of the coordinate y, the larger $N_a$.

Figure 7:
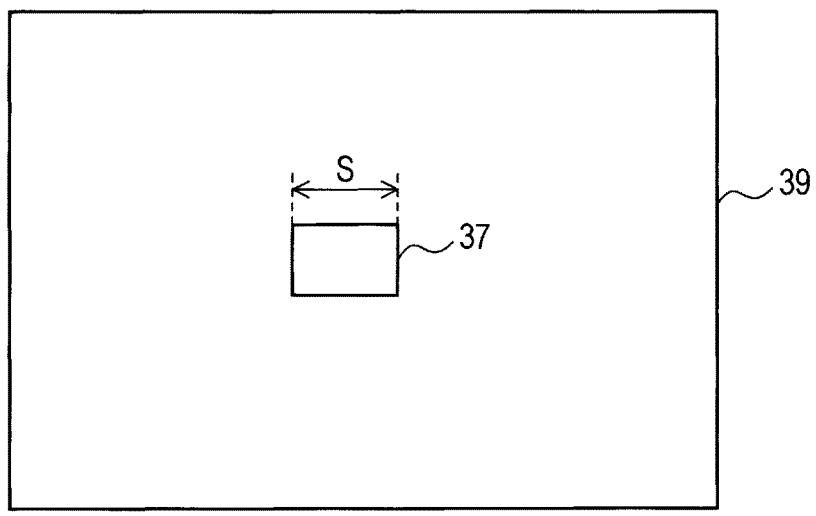
FIG. 7 is an explanatory diagram showing a size S.

In step S23, the parameter Y acquisition unit 11 obtains the size of the object candidate recognized in the step S2 in the image acquired in the step S1. As shown in FIG. 7, the size of the object candidate signifies the size S of the object candidate 37 in the image 39. It is noted that the size S is an example of a parameter Y which is correlated with the distance from the own vehicle to the object. The longer the distance from the own vehicle to the object becomes, the smaller the size S becomes.

Figure 8:
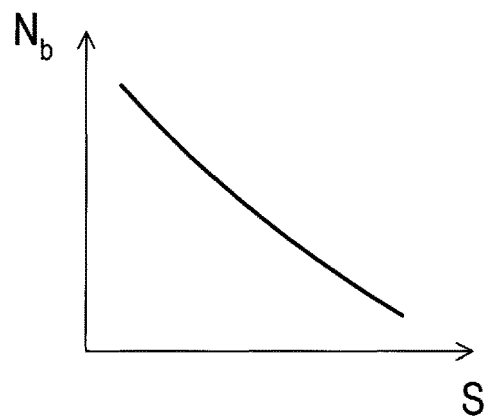
FIG. 8 is a graph showing a relationship between the size S and $N_b$.

In step S24, the N setting unit 13 calculates $N_b$ from the size S obtained in step S23. $N_b$ is a natural number. The N setting unit 13 is previously provided with a map that outputs $N_b$ when receiving the size S. The N setting unit 13 calculates $N_a$ by inputting the size S to the map. The map is appropriately used depending on the type of the object candidate (for example, a pedestrian, a vehicle, or the like). As shown in FIG. 8, the relationship between the size S and $N_b$ is that the larger the value of the size S, the smaller $N_b$.

In step S25, the parameter X acquisition unit 9 uses the steering angle sensor 23 to obtain a steering angle of the own vehicle. It is noted that the steering angle is an example of a parameter X, which is correlated with a moving speed of a stationary object obtained when the stationary object apparently moves in the images, and is an example of a parameter X correlated with the amplitude of yawing. The larger the steering angle becomes, the higher the moving speed of the stationary object, obtained when the stationary object apparently moves in the images, becomes. It is noted that the stationary target object signifies an object that is stationary with respect to the earth.

Figure 9:
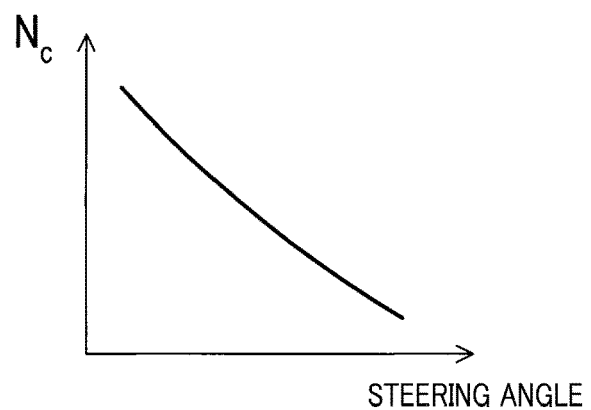
FIG. 9 is a graph showing a relationship between a steering angle and $N_c$.

In step S26, the N setting unit 13 calculates $N_c$ from the steering angle obtained in step S25. $N_c$ is a natural number. The N setting unit 13 is previously provided with a map that outputs $N_c$ when receiving the steering angle. The N setting unit 13 calculates $N_c$ by inputting the steering angle to the map. As shown in FIG. 9, the relationship between the steering angle and $N_c$ is that the larger the steering angle, the smaller $N_c$.

In step S27, the parameter X acquisition unit 9 uses the G sensor 21 to acquire the acceleration G. It is noted that the acceleration G is an example of a parameter X, which is correlated with the moving speed of a stationary object obtained when the stationary object apparently moves in the images, and is an example of a parameter correlated with the amplitude of pitching. The larger the acceleration G becomes, the larger the amplitude of pitching becomes, and the higher the moving speed of the stationary object, obtained when the stationary object apparently moves in the images, becomes.

Figure 10:
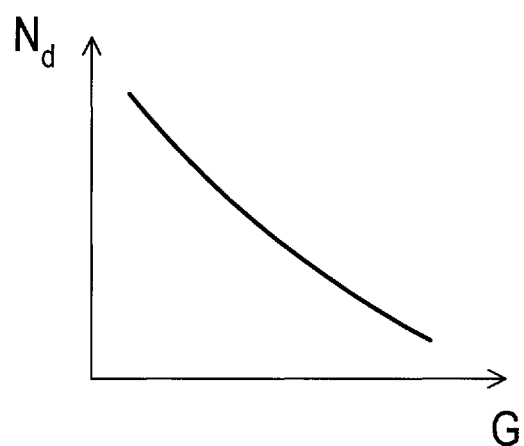
FIG. 10 is a graph showing a relationship between acceleration G and $N_d$.

In step S28, the N setting unit 13 calculates $N_d$ from the acceleration G obtained in the step S27. $N_d$ is a natural number. The N setting unit 13 is previously provided with a map that outputs $N_d$ when receiving the acceleration G. The N setting unit 13 calculates $N_d$ by inputting the acceleration G to the map. As shown in FIG. 10, the relationship between the acceleration G and $N_d$ is that the larger the acceleration G, the smaller becomes $N_a$.

In step S29, the parameter X acquisition unit 9 uses the vehicle speed sensor 17 to obtain the vehicle speed of the own vehicle. It is noted that the vehicle speed is an example of a parameter X, which is correlated with the moving speed of a stationary object obtained when the stationary object apparently moves in the images. The higher the vehicle speed becomes, the higher the moving speed of the stationary object, obtained when the stationary object apparently moves in the images, becomes.

Figure 11:
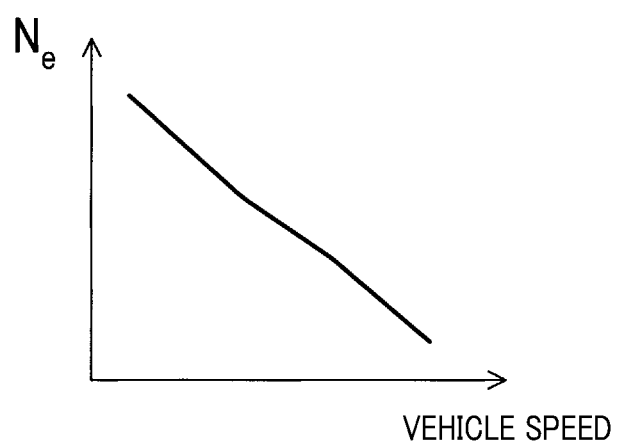
FIG. 11 is a graph showing a relationship between vehicle speed and $N_e$.

In step S30, the N setting unit 13 calculates $N_e$, from the vehicle speed obtained in the step S29. $N_e$ is a natural number. The N setting unit 13 is previously provided with a map that outputs $N_e$ when receiving the vehicle speed. The N setting unit 13 calculates $N_e$ by inputting the vehicle speed to the map. As shown in FIG. 11, the relationship between the vehicle speed and $N_e$ is that the higher the vehicle speed, the smaller $N_e$.

In step S31, the N setting unit 13 sets N by using $N_a$ calculated in the step S22, $N_b$ calculated in the step S24, $N_c$ calculated in the step S26, $N_d$ calculated in the step S28, and $N_e$ calculated in step S30. The N setting unit 13 is previously provided with a map that outputs N when receiving $N_a$, $N_b$, $N_c$, $N_d$ and $N_e$. The N setting unit 13 calculates N by inputting $N_a$, $N_b$, $N_c$, $N_d$ and $N_e$ to the map.

Figure 12A:
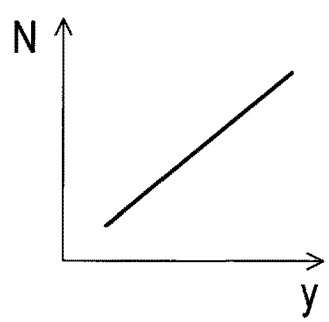
FIG. 12A is a graph showing a relationship between the y coordinate and N.

The relationships between N and the y coordinate, size S, steering angle, acceleration G, and vehicle speed are as follows. As shown in FIG. 12A, when the size S, steering angle, acceleration G, and vehicle speed are each constant, the greater the y coordinate, the greater becomes N.

Figure 12B:
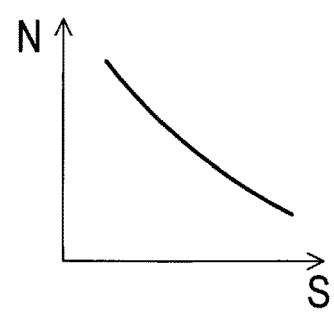
FIG. 12B is a graph showing a relationship between the size S and N.

In addition, as shown in FIG. 12B, when the coordinate y, the steering angle, the acceleration G, and the vehicle speed are constant, the larger the size S becomes, the smaller N becomes.

Figure 12C:
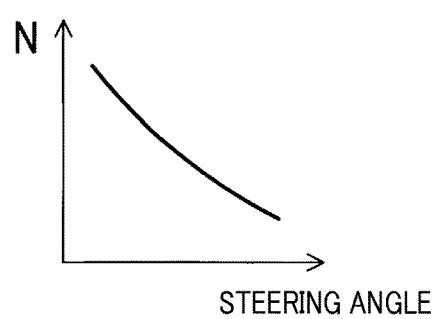
FIG. 12C is a graph showing a relationship between a steering angle and N.

In addition, as shown in FIG. 12C, when the coordinate y, the size S, the acceleration G, and the vehicle speed are constant, the larger the steering angle becomes, the smaller N becomes.

Figure 12D:
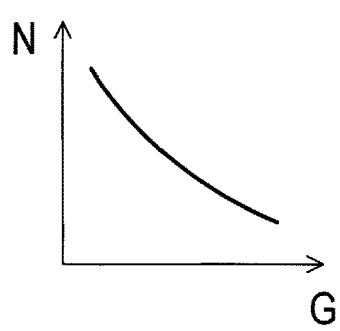
FIG. 12D is a graph showing a relationship between the acceleration G and N.

In addition, as shown in FIG. 12D, when the coordinate y, the size S, the steering angle, and the vehicle speed are constant, the larger the acceleration G becomes, the smaller N becomes.

Figure 12E:
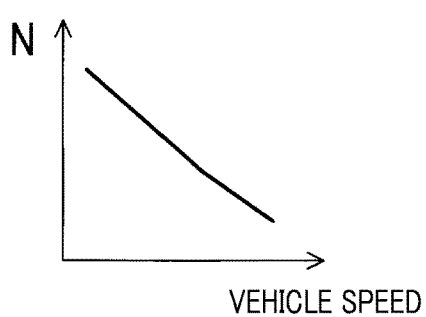
FIG. 12E is a graph showing a relationship between vehicle speed and N.

In addition, as shown in FIG. 12E, when the coordinate y, the size S, the steering angle, and the acceleration G are constant, the higher the vehicle speed becomes, the smaller N becomes.

4. Effects Provided by the Image Processing Apparatus 1

(1A) The steering angle, the acceleration G, and the vehicle speed are parameters correlated with the moving speed of a stationary object obtained when the stationary object apparently moves in the images. For example, the larger the steering angle becomes, the larger the yawing of the own vehicle becomes, and the higher the moving speed of the stationary object, obtained when the stationary object apparently moves in the images, becomes. In addition, the larger the acceleration G becomes, the larger the pitching of the own vehicle becomes, and the higher the moving speed of the stationary object, obtained when the stationary object apparently moves in the images, becomes. In addition, the higher the vehicle speed becomes, the higher the moving speed of the stationary object, obtained when the stationary object apparently moves in the images, becomes.

If N is held fixed even when the moving speed of a stationary object, obtained when the stationary object apparently moves in the images, is high, time is required to make a recognition determination of an object candidate in N consecutive frame images, thus producing a delay in responsiveness of vehicle control.

In the image processing apparatus 1, the greater the steering angle, the acceleration G, and the vehicle speed (the greater the moving speed of an object obtained when the object apparently moves in the images), the smaller N is set. As a result, the recognition time can be shortened, and responsiveness of control by the vehicle control apparatus can be enhanced.

In addition, in the image processing apparatus 1, when the steering angle, the acceleration G, and the vehicle speed are small, N is made large, whereby the accuracy in recognizing an object can be improved.

(1B) In the image processing apparatus 1, the steering angle, the acceleration G, and the vehicle speed are used as parameters in setting N. Hence, parameters can be easily acquired, and N can be easily calculated.

(1C) The image processing apparatus 1 uses the steering angle, which is correlated with the amplitude of yawing, and the acceleration G, which is correlated with the amplitude of pitching, as parameters used for setting N. As a result, N can be further suitably calculated.

(1D) The coordinate y and the size S are parameters that are correlated with the distance from the own vehicle to an object. For example, the smaller the coordinate y, the shorter the distance from the own vehicle to the object. In addition, the larger the size S, the shorter the distance from the own vehicle to the object.

When the distance from the own vehicle to an object is small, it is required to rapidly recognize an object (improving the responsiveness of recognizing an object). However, if N is fixed, it is difficult to improve the responsiveness.

The image processing apparatus 1 sets N smaller, as the coordinate y is smaller and the size S is larger (as the distance from the own vehicle to the object is shorter). Hence, the responsiveness to an object close to the own vehicle improves.

In addition, in the image processing apparatus 1, the longer the distance from the own vehicle to the object, the larger N is set, whereby the accuracy in recognizing an object can be improved.

OTHER EMBODIMENTS

The present invention is not limited to the embodiments described above, and various embodiments may be formed.

(1) In the step S25, instead of the steering angle, any of parameters of a steering angular velocity, a yaw rate, and a rate of change of the yaw rate may be acquired. In the step S26, $N_c$ may be calculated based on the acquired parameter. The relationships between the steering angular velocity and the like and $N_c$ are as below. The larger the steering angular velocity, the smaller $N_c$. The larger the yaw rate, the smaller $N_c$. The larger the rate of change of the yaw rate, the smaller $N_c$.

(2) In the step S27, instead of the acceleration G, a pitch angle or a rate of change of the pitch angle may be acquired to, in the step S28, calculate $N_d$ depending on the pitch angle or the rate of change of the pitch angle. The relationships between the pitch angle and the rate of change of the pitch angle, and $N_d$ are as below. The larger the pitch angle, the smaller $N_d$. The larger the rate of change of the pitch angle, the smaller $N_d$.

(3) The image processing apparatus 1 may include a map that outputs N when receiving the coordinate y, the size S, the steering angle, the acceleration G, and the vehicle speed. Then, N may be calculated by inputting the coordinate y, the size S, the steering angle, the acceleration G, and the vehicle speed obtained in steps S21, S23, S25, S27, and S29, to the map.

(4) The image processing apparatus 1 may calculate N by using part of $N_a$, $N_b$, $N_c$, $N_d$, and $N_e$. For example, N may be calculated from $N_a$ and $N_b$. Also in this case, the relationships between the coordinate y and the size S, and N may be as shown in FIG. 12A and FIG. 12B.

In addition, N may be calculated from $N_c$, $N_d$, and $N_e$. Also in this case, the relationships between the steering angle, the acceleration G, and the vehicle speed, and N may be as shown in FIG. 12C, FIG. 12D, and FIG. 12E.

(5) The image processing apparatus 1 may determine turning to the left or to the right of the own vehicle (the condition correlated with yawing) from road shape recognition using images acquired by the in-vehicle camera 15, a signal from the direction indicator switch 25, or road shape recognition using the GPS 27 and the map information storage section 29. During turning to the left or to the right, N can be set to be smaller compared with other cases. Hence, the recognition time is shortened, whereby the control responsiveness of the vehicle control apparatus can be improved.

In addition, the image processing apparatus 1 may determine undulation of the road (the condition correlated with pitching) by road shape recognition using images acquired by the in-vehicle camera 15 or road shape recognition using the GPS 27 and the map information storage section 29. Then, as undulation of the road is significant, N can be set to be smaller. Hence, the recognition time is shortened, whereby the control responsiveness of the vehicle control apparatus can be improved.

(6) The image processing apparatus 1 may be provided with means for acquiring weather and time information. Then, when the temperature or the time is a condition to make image recognition difficult to be performed (for example when it is raining, at night, or the like). N can be made large. Hence, the accuracy in recognizing an object can be improved.

(7) The image processing apparatus 1 may obtain the position x of an object in the horizontal direction of the image in the step S21 to calculate $N_a$ from the position x. The position x is an example of a parameter Y that is correlated with the distance from the own vehicle to the object. As the position x departs from the center in the horizontal direction of the image, the distance from the own vehicle to the object becomes large. The relationship between the position x and $N_a$ is that as the position x departs from the center in the horizontal direction of the image, $N_a$ becomes larger.

(8) If the lens of the vehicle-mounted camera 15 is a wide-angle lens that has uncorrected distortion, the moving speed of a stationary object, obtained when the stationary object apparently moves in the images, is high at the center of the images and is low on the periphery of the images. The image processing apparatus 1 can set N depending on the distortion of the captured images. When the lens of the vehicle-mounted camera 15 is a wide-angle lens, and an object candidate is present on the periphery of the images, N can be set larger compared with a case where the object candidate is present at the center. Hence, the accuracy in recognizing the object candidate present on the periphery of the images improves.

(9) Functions of one component in the above embodiment may be divided among a plurality of components. Functions of a plurality of components may be provided by one component. In addition, at least part of the configuration of the above embodiment may be replaced with a known configuration having the similar functions. In addition, part of the configuration of the above embodiment may be omitted. In addition, at least part of the configuration of the embodiment may be added to or replaced with the configuration of another embodiment.

(10) The present invention can be achieved by various embodiments, in addition to the image processing apparatus described above, such as a system including the image processing apparatus as a component, a program allowing a computer to function as the image processing apparatus, and a recording medium in which the program is stored, and an image processing method.

The image processing apparatus of the embodiment includes an image acquisition unit that uses a camera installed in an own vehicle to acquire images of an environment outside the own vehicle at predetermined intervals; an object candidate recognition unit that recognizes an object candidate in the image; an object determination unit that determines that the object candidate is an object on condition that the same object candidate is recognized in N consecutive frame images (N is a natural number); a parameter X acquisition unit that acquires a parameter X correlated with an apparent moving speed of a stationary object in the images; and an N setting unit that sets N smaller as the moving speed correlated with a value of the parameter X increases.

In the image processing apparatus according to the embodiment, the higher the apparent moving speed of the object in the images, the smaller N is set. Hence, the time required for recognizing an object that appears suddenly is shortened, whereby the control responsiveness of the vehicle control apparatus can be improved.

The image processing apparatus of the embodiment includes an image acquisition unit that uses a camera installed in an own vehicle to acquire images of an environment outside the own vehicle at predetermined intervals; an object determination unit that determines that the object candidate is an object on condition that the same object candidate is recognized in N consecutive frame images (N is a natural number); a parameter Y acquisition unit that acquires a parameter Y correlated with a distance from the own vehicle to an object; and an N setting unit that sets N smaller as the distance corresponding to a value of the parameter Y is shorter.

In the image processing apparatus according to the embodiment, the shorter the distance from the own vehicle to the object, the smaller N is set. Hence, the time required for recognizing an object, which is close to the own vehicle and for which it is assumed that a highly urgent response is necessary, is shortened, whereby the control responsiveness of the vehicle control apparatus can be improved.

REFERENCE SIGNS LIST

1 . . . image processing apparatus, 3 . . . image acquisition unit, 5 . . . object candidate recognition unit, 7 . . . object determination unit, 9 . . . parameter X acquisition unit, 11 . . . parameter Y acquisition unit, 13 . . . N setting unit, 14 . . . information outputting unit, 15 . . . in-vehicle camera, 17 . . . vehicle speed sensor, 19 . . . yaw sensor, 21 . . . G sensor, 23 . . . steering angle sensor, 25 . . . direction indicator switch, 27 . . . GPS, 29 . . . map information storage section, 31 . . . vehicle control apparatus, 35, 37 . . . object candidate, 39 . . . image, 41 . . . Vertical axis

The invention claimed is:

1. An image processing apparatus comprising:
a processor comprising:
an image acquisition unit that uses a camera installed in an own vehicle to acquire images of an environment outside the own vehicle at predetermined intervals;
an object candidate recognition unit that recognizes an object candidate in the image;
an object determination unit that determines that the object candidate is an object based on the same object candidate being recognized in N consecutive frame images;
a parameter X acquisition unit that acquires a parameter X correlated with an apparent moving speed of a stationary object in the images; and
an N setting unit that decreases the N consecutive frame images as the parameter X increases such that the object candidate is determined to be an object using fewer consecutive frame images as the apparent moving speed of the stationary object increases, wherein
the parameter X is at least one selected from a group including a steering angle, a steering angular velocity, a yaw rate, a rate of change of the yaw rate, a pitch angle, a rate of change of the pitch angle, a vehicle speed of the own vehicle, and an acceleration in a longitudinal direction of the own vehicle.

2. The image processing apparatus according to claim 1, characterized in that
the parameter X is a parameter correlated with an amplitude of yawing or of pitching of the own vehicle, and
the N setting unit sets N smaller as the yawing or pitching correlated with a value of the parameter X increases.

3. The image processing apparatus according to claim 1, characterized by comprising a parameter Y acquisition unit that acquires a parameter Y that is correlated with a distance from the own vehicle to an object; wherein
the N setting unit sets N smaller as the distance corresponding to a value of the parameter Y is shorter.

4. The image processing apparatus according to claim 3, characterized in that
the parameter Y is at least one selected from a group including a size of the object candidate in the image, a position of the object candidate in a vertical direction of the image, and a position of the object in a horizontal direction of the image.

5. An image processing apparatus comprising:
a processor comprising:
an image acquisition unit that uses a camera installed in an own vehicle to acquire images of an environment outside the own vehicle at predetermined intervals;
an object determination unit that determines that the object candidate is an object based on the same object candidate being recognized in N consecutive frame images;
a parameter Y acquisition unit that acquires a parameter Y correlated with a distance from the own vehicle to an object; and
an N setting unit that decreases the N consecutive frame images as the parameter Y decreases such that the object candidate is determined to be an object using fewer consecutive frame images as the distance from the own vehicle to the object decreases.

6. The image processing apparatus according to claim 5, characterized in that
the parameter Y is at least one selected from a group including a size of the object candidate in the image, a position of the object candidate in a vertical direction of the image, and a position of the object in a horizontal direction of the image.

* * * * *